US008665880B2

(12) United States Patent
Yavuz et al.

(10) Patent No.: US 8,665,880 B2
(45) Date of Patent: Mar. 4, 2014

(54) TECHNIQUES FOR DISTRIBUTING CONTENT TO MULTIPLE DEVICES IN A COMMUNICATION NETWORK

(75) Inventors: Mehmet Yavuz, San Diego, CA (US); Matthew Stuart Grob, San Diego, CA (US); Nagesh S. Nandiraju, Horsham, PA (US)

(73) Assignee: QUALCOMM Incorporated, San Diego, CA (US)

( * ) Notice: Subject to any disclaimer, the term of this patent is extended or adjusted under 35 U.S.C. 154(b) by 1115 days.

(21) Appl. No.: 11/859,716

(22) Filed: Sep. 21, 2007

(65) Prior Publication Data

US 2009/0081944 A1   Mar. 26, 2009

(51) Int. Cl.
*H04L 12/28* (2006.01)

(52) U.S. Cl.
USPC .......................... 370/395.4; 370/390; 370/432

(58) Field of Classification Search
None
See application file for complete search history.

(56) References Cited

U.S. PATENT DOCUMENTS

| 6,144,727 | A  | * | 11/2000 | Mashinsky ............... 379/114.02 |
| 6,487,390 | B1 | * | 11/2002 | Virine et al. ................. 455/3.01 |
| 6,704,576 | B1 |   | 3/2004  | Brachman et al. |
| 6,947,397 | B2 | * | 9/2005  | Kim et al. ...................... 370/329 |
| 7,295,568 | B2 |   | 11/2007 | Kossi et al. |
| 7,397,817 | B2 | * | 7/2008  | Kawaguchi et al. .......... 370/465 |
| 7,505,731 | B2 | * | 3/2009  | Aaltonen et al. ............. 455/3.01 |
| 7,672,667 | B2 | * | 3/2010  | Ramesh et al. ............ 455/422.1 |
| 2004/0113936 | A1 | * | 6/2004 | Dempski ....................... 345/738 |
| 2005/0172016 | A1 | * | 8/2005 | Kossi et al. .................... 709/223 |
| 2007/0008969 | A1 | * | 1/2007 | Elstermann et al. .......... 370/390 |
| 2008/0208949 | A1 | * | 8/2008 | Tanaka et al. ................. 709/201 |
| 2008/0242290 | A1 | * | 10/2008 | Bhatia et al. ............... 455/422.1 |
| 2009/0081944 | A1 | * | 3/2009 | Yavuz et al. ................. 455/3.01 |

FOREIGN PATENT DOCUMENTS

| EP | 1434385 A1 | 6/2004 |
| EP | 2099161 A1 | 9/2009 |
| JP | 2009519677 A | 5/2009 |
| WO | WO2006072825 | 7/2006 |
| WO | WO2007070241 A2 | 6/2007 |

OTHER PUBLICATIONS

International Search Report and Written Opinion—PCT/US2008/077109, International Searching Authority—European Patent Office, May 6, 2009.
Taiwan Search Report—TW097136406—TIPO—Jan. 19, 2012.

* cited by examiner

*Primary Examiner* — Robert W Wilson
(74) *Attorney, Agent, or Firm* — Nicholas J. Pauley; Peter Michael Kamarchik; Joseph Agusta (57) ABSTRACT

This disclosure describes techniques for scheduling distribution of content to a plurality of devices in a communication network, such as a cellular-based wireless network. According to this disclosure, two or more distribution techniques may be used, and scheduling techniques are performed to determine which distribution technique to use for different content. For example, content can be broadcast to all devices on the network (broadcast), multicast within several cells of the network (multi-cell multicast), multicast in a specific cell of the network (single cell multicast), or unicast to one or more specific devices within specific cells of the network (unicast). The scheduling techniques described in this disclosure may improve content distribution by substantially maximizing the number of content requests that are satisfied, particularly when bandwidth is limited.

26 Claims, 7 Drawing Sheets

TECHNIQUES FOR DISTRIBUTING CONTENT TO MULTIPLE DEVICES IN A COMMUNICATION NETWORK

TECHNICAL FIELD

This disclosure relates to content distribution to devices in a communication network, such as a cellular-based wireless network.

BACKGROUND

In many communication networks, content is distributed to different devices of the network. The devices that receive such content may comprise any of a wide variety of devices, including digital televisions, set-top boxes, wireless communication devices, personal digital assistants (PDAs), laptop or desktop computers, video gaming devices, video game consoles, cellular or satellite radio telephones, and the like. Users may order content from a service provider of the network via the devices. In response, the content can be delivered to the devices. For example, video distribution may be supported in a network. In this case, users can place requests for movies or other video that they want to watch. The requested movies are then distributed to the user devices, possibly for a fee.

Content distribution, however, is not limited to video. In particular, a wide variety of content may be delivered to users according to content distribution techniques. Generally, content may include movie files, audio files, video files, software packages, software upgrades, data files, video games, or any of a wide variety of other types of content useful for execution or presentation on a device. Wireless and wire-based network distribution of content is rapidly replacing conventional distribution techniques, e.g., that relied on physical media such as compact discs (CDs) and digital video discs (DVDs) for content distribution.

SUMMARY

In general, this disclosure describes techniques for scheduling distribution of content to a plurality of devices in a communication network, such as a cellular-based wireless network. According to this disclosure, two or more distribution techniques may be used, and scheduling techniques are performed to determine which distribution technique to use for different content. For example, content can be broadcast to all devices on the network (broadcast), multicast within several cells of the network (multi-cell multicast), multicast in a specific cell of the network (single cell multicast), or unicast to one or more specific devices within specific cells of the network (unicast). Content that is requested by multiple devices may be a better candidate for broadcast or multi-cell multicast, while content that is requested by a single device or very few devices in the network may be a better candidate for unicast or single cell multicast. The scheduling techniques described in this disclosure may improve content distribution by substantially maximizing the number of content requests that are satisfied, particularly when bandwidth is limited.

In one example, this disclosure provides a method for scheduling distribution of content to a plurality of devices in a wireless communication network, the method comprising receiving content requests associated with the plurality of devices, scheduling distribution of a first set of content to a first set of the devices via a first distribution technique in response to the content requests, and scheduling distribution of a second set of content to a second set of the devices via a second distribution technique in response to the content requests. If desired, the scheduling process may continue by scheduling distribution of additional sets of content until all user requests are satisfied, or all available bandwidth is used.

In another example, this disclosure provides an apparatus that schedules distribution of content to a plurality of devices in a wireless communication network, the apparatus comprising a receiver that receives content requests associated with the plurality of devices, and a scheduler that schedules distribution of a first set of content to a first set of the devices via a first distribution technique in response to the content requests, and schedules distribution of a second set of content to a second set of the devices via a second distribution technique in response to the content requests.

In another example, this disclosure provides an apparatus that schedules distribution of content to a plurality of devices in a wireless communication network, the apparatus comprising means for receiving content requests associated with the plurality of devices, and means for scheduling distribution of a first set of content to a first set of the devices via a first distribution technique in response to the content requests and a second set of content to a second set of the devices via a second distribution technique in response to the content requests.

In another example, this disclosure provides a content distribution node comprising communication interfaces that interface with base stations of a wireless communication network, a receiver that receives content requests associated with a plurality of devices in the wireless communication network from the base stations via the communication interfaces, and a scheduler that schedules distribution of a first set of content to a first set of the devices via a first distribution technique in response to the content requests, and schedules distribution of a second set of content to a second set of the devices via a second distribution technique in response to the content requests. The content distribution node may also include a transmitter that sends information to the base stations via the communication interfaces to instruct the base stations to distribute the first set of content to the first set of the devices via the first distribution technique and distribute the second set of content to the second set of the devices via the second distribution technique.

In another example, this disclosure provides a communication system comprising a plurality of wireless communication devices, a plurality of base stations that form communication cells for the wireless communication devices in the communication system, and a content distribution node. The content distribution node includes communication interfaces that interface with the base stations, a receiver that receives content requests associated with the plurality of wireless communication devices from the base stations via the communication interfaces, a scheduler that schedules distribution of a first set of content to a first set of the wireless communication devices via a first distribution technique in response to the content requests, and schedules distribution of a second set of content to a second set of the wireless communication devices via a second distribution technique in response to the content requests, and a transmitter that sends information to the base stations via the communication interfaces to instruct the base stations to distribute the first set of content to the first set of the wireless communication devices via the first distribution technique and distribute the second set of content to the second set of the wireless communication devices via the second distribution technique. Upon receiving the information from the content distribution node, the base stations distribute the first set of content to the first set of the wireless communication devices via the first distribution technique and distribute the second set of content to the second set of the wireless communication devices via the second distribution technique.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium and loaded and executed in the processor.

Accordingly, this disclosure also contemplates a computer readable medium comprising instructions that upon execution cause a device that receives content requests associated with the plurality of devices to schedule distribution of a first set of content to a first set of the devices via a first distribution technique in response to the content requests, and schedule distribution of a second set of content to a second set of the devices via a second distribution technique in response to the content requests.

In some cases, the computer-readable medium may form part of a computer program product, which may be sold to manufacturers and/or used in a content distribution node device. The computer program product may include the computer-readable medium, and in some cases, may also include packaging materials.

If implemented in hardware, this disclosure may be directed to a circuit that is configured to perform one or more of the techniques described herein. The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Various aspects of the disclosure are described below. It should be apparent that the teachings herein may be embodied in a wide variety of forms, and that any specific structure, function, or both being disclosed herein is merely representative. Based on the teachings herein, one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

This disclosure describes techniques for scheduling distribution of digital multimedia content to a plurality of devices in a communication network, such as a cellular-based wireless network. Such networks may support a variety of content deliver techniques. For example, the content can be broadcast to all devices on the network (broadcast), or multicast within several cells of the network (multi-cell multicast). In addition, the content may be multicast in a specific cell of the network (single cell multicast), or unicast to one or more specific devices within specific cells of the network (unicast). According to this disclosure, scheduling techniques are performed to determine which distribution technique to use for different content.

In particular, according to this disclosure, two or more distribution techniques may be used, and scheduling techniques may be performed to determine which distribution technique to use for different content. Content that is requested by multiple devices may be a better candidate for broadcast or multi-cell multicast, while content that is requested by a single device or very few devices in the network may be a better candidate for unicast or single cell multicast. The scheduling techniques described in this disclosure may improve content distribution by substantially maximizing the number of content requests that are satisfied, particularly when bandwidth is limited. In this way, the number of content requests that are satisfied in a bandwidth-limited cellular network may be improved relative to conventional techniques that use only one type of distribution technique, such as broadcast.

Figure 1:
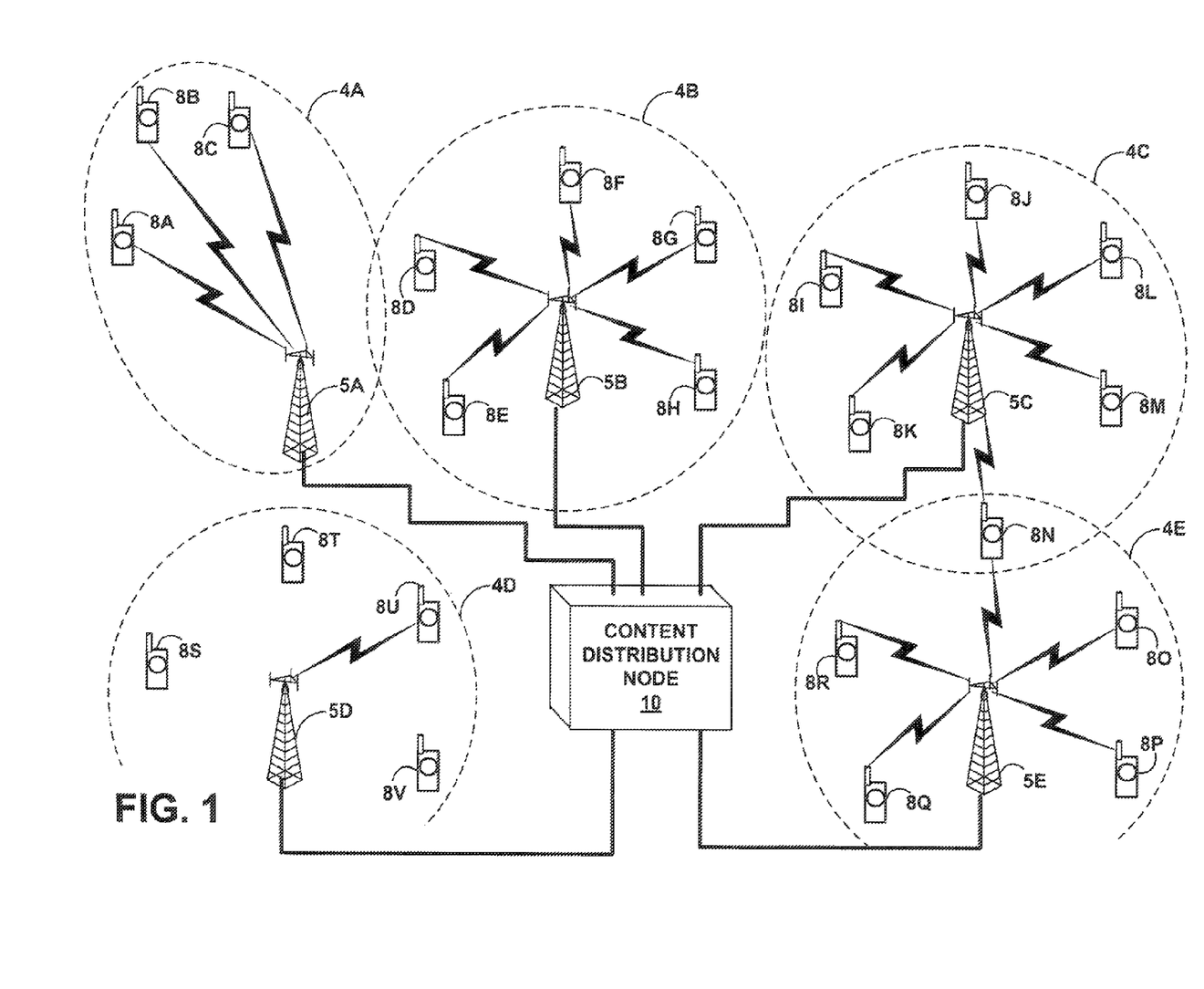
FIG. 1 is a conceptual diagram illustrating an exemplary communication network that may implement one or more of the techniques of this disclosure.

FIG. 1 is a conceptual diagram illustrating an exemplary communication network 2 that may implement one or more of the techniques of this disclosure. Communication network 2 is a cellular-based network comprising cells 4A-4E (collectively cells 4). Base stations 5A-5E (collectively base stations 5) define cells 4, and can wirelessly communicate with wireless communication devices 8A-8V (collectively devices 8) within the different cells. Network 2 is exemplary, as the techniques of this disclosure may be useful in a wide variety of other types of networks.

Although devices 8 are illustrated as being wireless handsets, devices 8 may generally comprise any of a wide variety of devices, including digital televisions, set-top boxes, personal digital assistants (PDAs), laptop or desktop computers, video gaming devices, video game consoles, cellular or satellite radio telephone handsets, and the like. Base stations 5 may define a wide variety of cells 4, and cells 4 may define a wide variety of shapes and topologies. Natural landscape and man-made structures may affect the shapes of cells 4. In some cases, one or more cells 4 may comprise high-altitude cells, e.g., for wireless communication with aircraft or devices on aircraft. This disclosure is not limited to any network shape or topology. Furthermore, although system 2 is illustrated as a wireless system, the content distribution and scheduling techniques described herein are not necessarily limited to wireless networks, but could also be useful in systems that have wired connections between distribution devices (like base stations 5) and receiving devices (like devices 8) or in systems that use wired and wireless connections.

Content distribution node 10 facilitates the scheduling of content distribution to devices 8 using the techniques of this disclosure. Content distribution node 10 may comprise any network device. In some cases, content distribution node 10 may itself comprise a base station, and in other cases, content distribution node 10 may comprise an access point, router, network device, or any other network equipment configured to perform the scheduling techniques described herein. Users of devices 8 may order content from a service provider of network 2 via the devices 8. Devices 8 communicate such content requests to base stations 5, which then send the requests to content distribution node 10 for scheduling. As one example, video distribution may be supported in network 2. In this case, users can place requests for movies or other video that they want to watch. The requested movies are then distributed from base stations 5 to devices 8, possibly for a fee.

Again, content distribution node 10 facilitates the scheduling of content distribution to devices 8. The content itself may be stored in content distribution node 10, although this disclosure is not necessary limited in this respect. For example, the content could be sent from content distribution node 10 to one or more of base stations 5 for distribution to devices 4, or the content could be stored at base stations 5, in which case, content distribution node 10 may simply command or instruct base stations 5 how and where to deliver the content.

System 2 may support a number of different distribution techniques. As one example, system 2 may support broadcasting techniques. In broadcasting, content is broadcast to all devices 8 in network 2. In this case, each of base stations 5 broadcasts the same content to all of devices 8. Those specific devices that ordered such content may be able to receive such content from the broadcast, while any devices that did not order the broadcast content may ignore the content. In some cases, devices 8 may require a code or access key in order to access content that is broadcast by base stations 5. For example, the content may be encrypted, and those of devices 8 that ordered such content may be provided a key to facilitate decryption of the broadcasted content.

A broadcast in a code division multiple access (CDMA) network may comprise a communication on broadcast channel for which every device in the network has the proper codes to access the communication. A broadcast in a frequency division multiple access (FDMA) or orthogonal frequency division multiplex (OFDM) network may comprise a communication on a particular broadcast frequency or frequency slot that every device in the network can access. A broadcast in a time division multiple access network (TDMA) network may comprise a communication on a designated broadcast time slot that every device in the network can access. Many other types of systems and wireless modulation techniques could also be used, consistent with this disclosure. For example, the techniques may be implemented in a WiMAX network, as set forth in the IEEE 802.16 standard.

As a second example, system 2 may also support multi-cell multicast techniques. A multi-cell multicast is similar to a broadcast. In a multi-cell multicast, however, some of base stations 5 do not send the content. That is to say, in a multi-cell multicast, several but not all of base stations 5 send the content to all of the devices in the respective cells. Thus, in a multi-cell multicast, a subset of base stations 5 delivers the content in the same way that they would in a broadcast.

A multi-cell multicast in a CDMA network may comprise a communication on a specific channel for which every device in a subset of cells 4 has the proper codes to access the communication. A multi-cell multicast in an FDMA or OFDM network may comprise a communication on a particular multicast frequency or frequency slot that every device in a subset of cells 4 can access. A multi-cell multicast in a TDMA network may comprise a communication on a designated time slot that every device in a subset of cells 4 in the network can access.

As a third example, system 2 may also support single cell multicast techniques. A single cell multicast is also similar to a broadcast and a multi-cell multicast, but in a single cell multicast, only one of base stations 5 sends the content to all devices in its given cell. Thus, in a single cell multicast, one of base stations 5 delivers the content in the same way that they would in a broadcast, but the others of base stations 5 do not send any content.

A single cell multicast in a CDMA network may comprise a communication on a particular channel for which every device in one of cells 4 has the proper codes to access the communication. A single cell multicast in an FDMA or OFDM network may comprise a communication on a particular multicast frequency or frequency slot that every device in one of cells 4 can access. A single cell multicast in a TDMA network may comprise a communication on a designated multicast time slot that every device in a particular one of cells 4 can access.

As a fourth example, system 2 may also support unicast techniques. A unicast is a communication from one of base stations 5 to a specific one of devices 8. For example, a unicast can be seen in cell 4D of FIG. 1, where base station 5D delivers content to device 8U, but does not deliver content to the other devices 8S, 8T and 8V within cell 4D.

A unicast in a CDMA network may comprise a communication for which only a specific device within a given cell has the proper codes to access the communication. A unicast in an FDMA or OFDM network may comprise a communication on a particular unicast frequency or frequency slot that only a specific device can access. A unicast in a TDMA network may comprise a communication on a designated unicast time slot that only a particular device can access.

In accordance with this disclosure, content distribution node 10 performs a method for scheduling distribution of content to a plurality of devices 8 in a wireless communication network. Content distribution node 10 may receive content requests associated with devices 8, and schedule distribution of a first set of content to a first set of devices 8 via a first distribution technique. Content distribution node 10 may also schedule distribution of a second set of content to a second set of devices 8 via a second distribution technique. The first and second sets of devices may be different ones of devices 8, and the first distribution technique may be different than the second distribution technique. The different distribution techniques may be selected based on the content requests to substantially maximize a number of the content requests to be satisfied. The scheduling is not limited to scheduling of two distribution techniques. Indeed, any number of distribution techniques may be scheduled according to this disclosure. In some cases, the scheduling process may continue to schedule distribution of additional sets of content until all user requests are satisfied, or all available bandwidth is used.

In making the scheduling decisions, content distribution node 10 may use channel information associated with devices 8. For example, base stations 5 may send channel information, such as path loss information associated with devices 8 to content distribution node 10. Content distribution node 10 receives the channel information associated with devices 8 and schedules the distribution of the first set of content to the first set of devices 8 and schedules the distribution of the second set of content to the second set of devices 8 based on both the content requests and the channel information to substantially maximize a number of the content requests to be satisfied. The channel information can help content distribution node 10 formulate an accurate assessment of the bandwidth between different base stations 5 and different devices 8, which in turn can be used to select appropriate techniques for content distribution.

Again, the communication network defined by system 2 may comprise a cellular-based communication network, e.g., in which base stations 5 define different cells 4 that support wireless communication. The first distribution technique may comprise a set of unicasts to specific ones of devices 8 within specific ones of cell 4 of the communication network. The second distribution technique may comprise a multicast to multiple devices within one or more of cell 4. In another example, the first distribution technique may comprise a cell-based multicast to devices within a specific one of cells 4, and the second distribution technique may comprise a multi-cell-based multicast to devices within multiple cells 4. In another example, the first distribution technique may comprise a single cell-based multicast, and the second distribution technique may comprise a network-wide broadcast to all of devices 8 via all of base stations 5.

In other examples, content distribution node 10 may schedule distribution of content according to three or more distribution techniques, such as three different techniques selected from a unicast, a single cell multicast, a multi-cell multicast, and a broadcast. Furthermore, content distribution node 10 may schedule distribution of content according to four different distribution techniques, such as a unicast, a single cell multicast, a multi-cell multicast, and a broadcast.

The distributed content may comprise any of a wide variety of possible content. The distributed content may include, but is not limited to, one or more movies, audio files, video files, software packages, video games, software upgrades, and data files. Content distribution node 10 may determine a number of the content requests that would be satisfied for different combinations of the content delivered via the first distribution technique and the second distribution technique, and select a combination that substantially maximizes a number of content requests that would be satisfied.

Content distribution node 10 may send information to base stations 5 to instruct base stations 5 to distribute the first set of content to the first set of devices 8 via the first distribution technique and to distribute the second set of content to the second set of devices 8 via the second distribution technique. In some cases, content distribution node 10 may forward the actual content to base stations 5 for distribution. In other cases, the content may be stored at base stations 5 or delivered to base stations 5 from a totally separate database. In any case, bases stations 5 distribute the first set of content to the first set of devices 8 via the first distribution technique, and distribute the second set of content to the second set of devices 8 via the second distribution technique.

In some cases, the techniques of this disclosure may be applied to support a video distribution service. In one example, the techniques of this disclosure may be used to facilitate movie or video distribution from wireless base stations to wireless set-top boxes. In movie distribution systems, customers place requests for the movies that they wish to watch. Usually the requests of customers are based on either a box-office distribution model or rental movie distributions model. The box-office distribution model may be characterized by a relatively small number of movies that are in high demand to customers, while the rental distribution model may be characterized by a relatively large number of movies that are in lower demand to most customers. In both models, there are typically some movies that are very popular and many customers request these popular movies.

One objective of content distribution node 10, in accordance with this disclosure, may be to substantially maximize the satisfied requests for a given amount of bandwidth. Once all the content requests (such as movie requests) have arrived for a given day, content distribution node 10 may sort the requests and aggregate any requests that are common to several users. Content distribution node 10 may then determine a desirable balance between two or more distribution techniques (e.g., unicast, single cell multicast, multi-cell multicast, and broadcast). Content distribution node 10 may examine different combinations of distribution techniques, and choose one of the combinations that satisfies the most requests for a given amount of bandwidth.

As an example, content distribution node 10 may balance between a network-wide broadcast for one or more movies, and a single cell multicast for the movies. In this example, content distribution node 10 may determine a Spectral Efficiency for Broadcasting (SEB), which specifies the number of bits that can be transmitted per second per Hz when broadcasting is used in the network. Content distribution node 10 may also determine a Spectral Efficiency for Single Cell Multicast (SESCM), which specifies the number of bits that can be transmitted per second per Hz while single cell multicasting. The SESCM may be different for different cells.

Content distribution node 10 may also determine a broadcast capacity (BC). The BC refers to the total number of movies that can be broadcasted to the entire network, given a spectral efficiency for broadcasting (SEB), and a given bandwidth allocated for broadcasting. The BC may assume, for example, that an entire day can be used serving the movie requests. The BC may be calculated according to the following formula:

$$BC = (\text{Total time in one day})/(\text{Time to broadcast one movie})$$

where, $$\text{Time to Broadcast one movie} = (\text{Movie Size[in bits]})/((SEB) * (\text{Total Bandwidth for Broadcast})).$$

The Movie Size refers, e.g., to the size of an HD/DVD movie in bits. Total Bandwidth is the bandwidth allocated for broadcast between base stations 5 and devices 8 in system 2.

Content distribution node 10 may also determine a single cell multicast capacity (SCMC). The SCMC is the total number movies that can be single cell multicast, given a SCMCU and an allocated bandwidth for single cell multicasting.

SCMC may also assume that the entire day can be used serving the requests. The SCMC may be calculated as:

SCMC=(Total time in one day)/(Time to single cell multicast one movie)

where,

Time to single cell multicast one movie=(Movie Size [in bits])/((SESCM)*(Total Bandwidth for single cell multicast)).

Given an upper bound on the number of movies that can be broadcasted or single cell multicast, content distribution node 10 can form several different combinations of numbers of movies that can be single cell multicast (SSMi) and broadcasted (Bi) by using the following formula.

(SSMi,Bi)=((X−i),(Time in one day−SSMi*time to single cell multicast)/(time to broadcast)

where $0 \le i \le X$.

For example, assume that SEB is 3 times the SESCM, and 24 movies can be broadcasted or 8 movies can be single cell multicast in one day. In this case, content distribution node 10 can form 8 different combinations:

8 single cell multicast, 0 broadcast,
7 single cell multicast, 3 broadcast
6 single cell multicast, 6 broadcast
5 single cell multicast, 9 broadcast
4 single cell multicast, 12 broadcast
3 single cell multicast, 15 broadcast
2 single cell multicast, 18 broadcast
1 single cell multicast, 21 broadcast
0 single cell multicast, 24 broadcast).

The objective of content distribution node 10 is to find a desirable combination that can satisfy the maximum number of requests made by the customers.

Content distribution node 10 may execute an algorithm as follows:

```
for a given set of movie requests, broadcast and single cell multicast
  capacity
    for each combination (SSMi , Bi).
      evaluate number of requests satisfied
    end
  end
combination that maximizes total satisfied requests is the desirable
  combination
```

This algorithm chooses the best combination that satisfies most users. Content distribution node 10 instructs base stations 5 to distribute the movies using the combination determined by the algorithm above. In particular, content distribution node 10 may instruct base stations 5 to first broadcast most popular movies to the entire network, and then transmit the remaining requested movies via single cell multicasting to different customers in different cells 4 until the end of the day (or another defined period of time).

Figure 2:
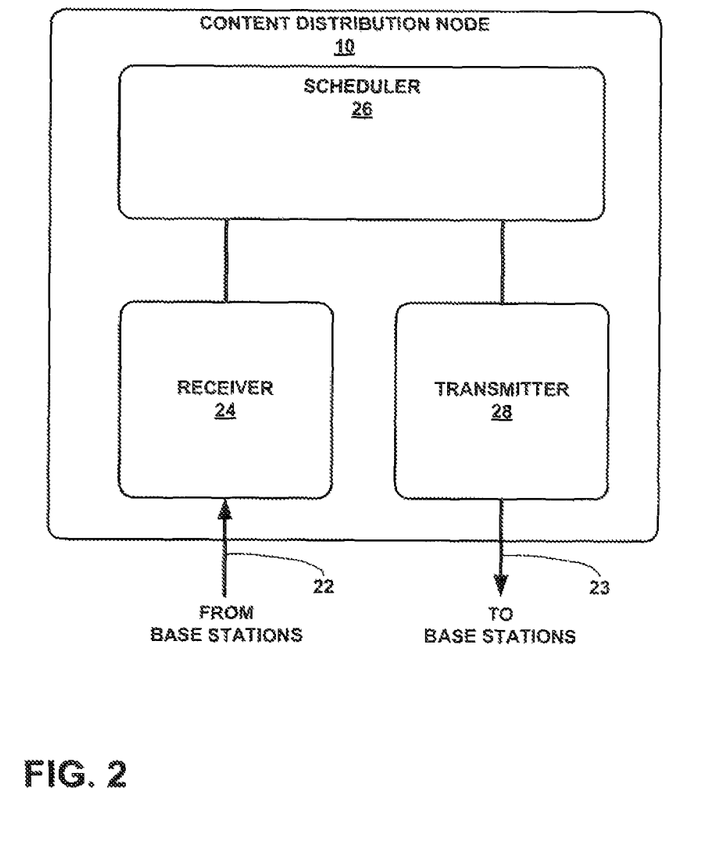
FIG. 2 is a block diagram illustrating an exemplary content distribution node that may implement one or more of the techniques of this disclosure.

FIG. 2 is a block diagram illustrating an exemplary content distribution node 10 that may implement one or more of the techniques of this disclosure. Content distribution node 10 includes communication interfaces 22, 23 that interface with the base stations 5 (see also FIG. 1). Communication interfaces 22 and 23, for example, may comprise in-bound and out-bound communication ports on content distribution node 10, and may comprise a combined port in some cases. Communication interfaces 22 and 23 may comprise wired or wireless interfaces. If communication interfaces 22 and 23 are wireless interfaces, they may comprise one or more antennas.

Receiver 24 receives content requests associated with devices 8 from base stations 5 via communication interface 22. In addition, receiver 24 may receive other information from base stations 5, such as channel information associated with the wireless communication channels between devices 8 and base stations 5. For example, receiver 24 may comprise a receiver module that includes memory or input buffers to store the content requests or other information received from base stations 5.

Scheduler 26 schedules distribution of a first set of content to a first set of devices 8 via a first distribution technique, and schedules distribution of a second set of content to a second set of devices 8 via a second distribution technique. For example, scheduler 26 may choose between two more of the following techniques for different sets of content: broadcast, multi-cell multicast, single cell multicast and unicast. Transmitter 28 outputs the scheduling information generated by scheduler 26 to base stations 5, e.g., via communication interface 23. Transmitter 28, for example, may comprise a transmitter module that includes memory or output buffers to temporarily store the scheduling information generated by scheduler 26.

Figure 3:
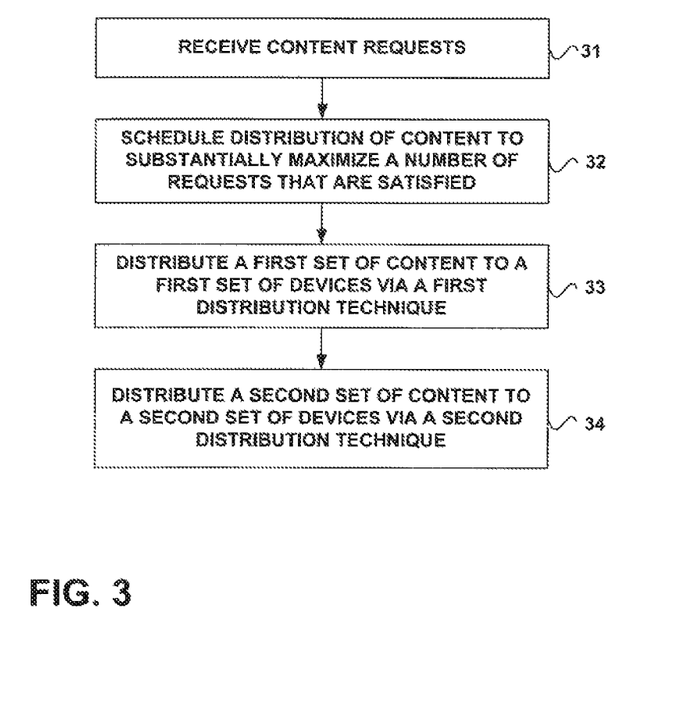
FIGS. 3 and 4 are flow diagrams illustrating exemplary techniques consistent with this disclosure.

FIG. 3 is a flow diagram illustrating an exemplary technique consistent with this disclosure. As shown in FIG. 3, receiver 24 receives content requests associated with devices 8 of system 2 (31). The content requests, for example, may be sent by users of devices 8 to base stations 5 and forwarded by base stations 5 to content distribution node 10 via communication interface 5. Once content distribution node 10 has received all of the content requests for a given period (such as for a given day), scheduler 26 schedules distribution of content to substantially maximize a number of requests that are satisfied (32). To do so, scheduler 26 may choose between two more of the following techniques for different sets of content: broadcast, multi-cell multicast, single cell multicast and unicast. Transmitter 28 may then communicate the scheduling information to base stations 5, e.g., via communication interface 23. Base stations 5 receive the scheduling information, base stations 5 distribute a first set of content to a first set of devices via a first distribution technique (33) and distribute a second set of content to a second set of devices via a second distribution technique (34). In distributing content, base stations 5 may first perform any broadcasting, then any multi-cell multicasting, then any single cell multicasting, and finally any unicasting. This type of priority scheme in the content distribution can further help to ensure that a maximum number of content requests are satisfied by prioritizing those techniques that deliver content to more users over those that deliver content to fewer users.

Figure 4:
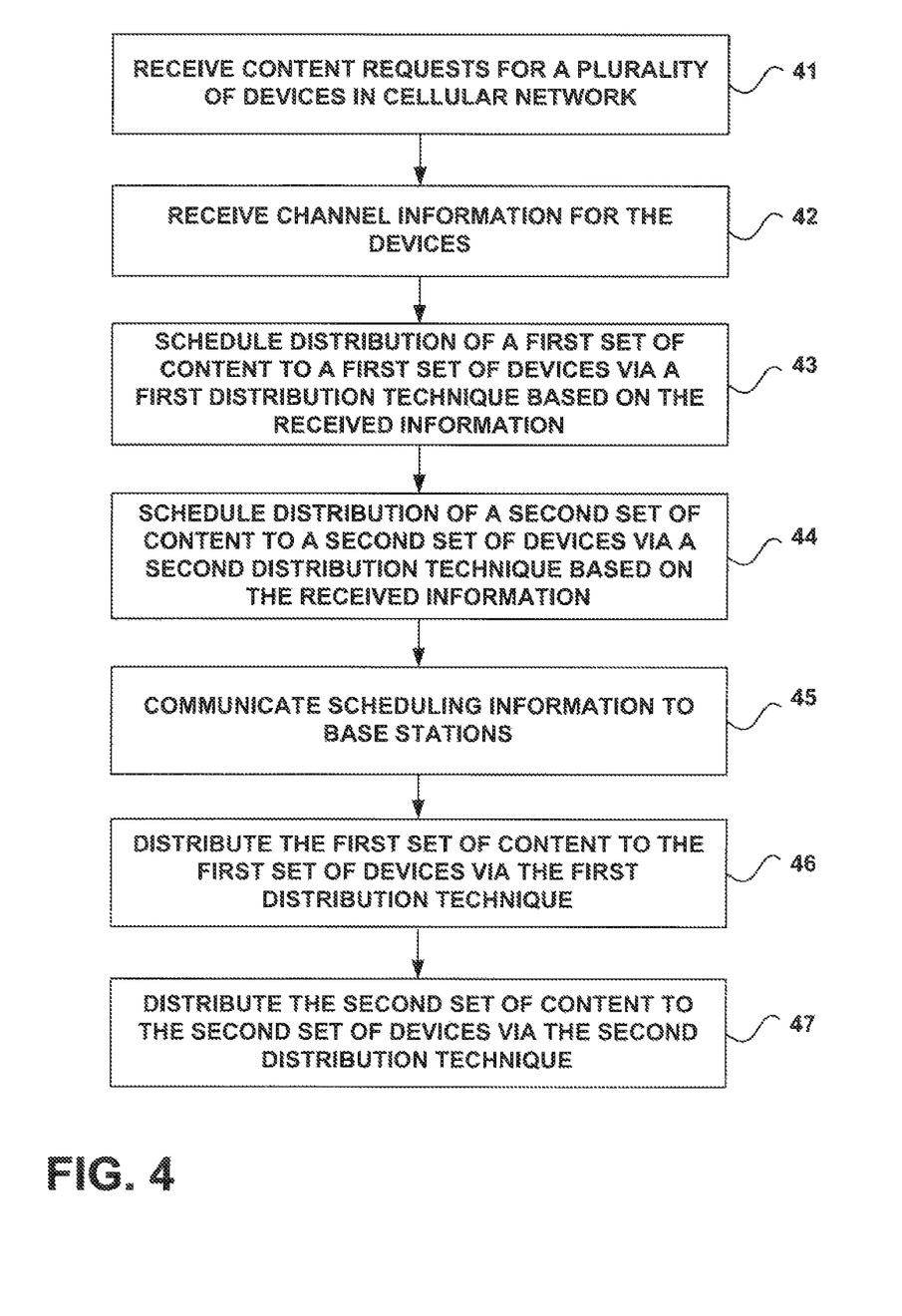

FIG. 4 is another flow diagram illustrating an exemplary technique consistent with this disclosure. As shown in FIG. 4, receiver 24 of content distribution node 10 receives content request from base stations 5 for a plurality of devices 8 in a cellular network (41). In addition, receiver 24 receives channel information for devices 8 (42), e.g., such as path loss or signal to interference noise ratio (SINR) information associated with wireless channels between devices 8 and base stations 5. Channel information can be used to determine the achievable spectral efficiency for each technique. For example for single cell unicast, SINR determines the data rate that can be used to transmit media content to the user.

Scheduler 26 schedules distribution of a first set of content to a first set of devices 8 via a first distribution technique based on the received information (43). In addition, scheduler 26 schedules distribution of a second set of content to a second set of devices 8 via a second distribution technique based on the received information (44). Transmitter 28 of content distribution node 10 communicates scheduling information indicative of the selected content distribution techniques to base stations 5 (45). Base stations 5 then distribute a first set of content to a first set of devices via a first distribution technique (46), and distribute a second set of content to a second set of devices via a second distribution technique (47). Again, the first and second distribution techniques may each comprise one of the following: broadcasting, multi-cell multicasting, single cell multicasting, and unicasting. In distributing content, base stations 5 may prioritize the distribution by first performing any broadcasting, then any multi-cell multicasting, then any single cell multicasting, and finally any unicasting.

Figure 5:
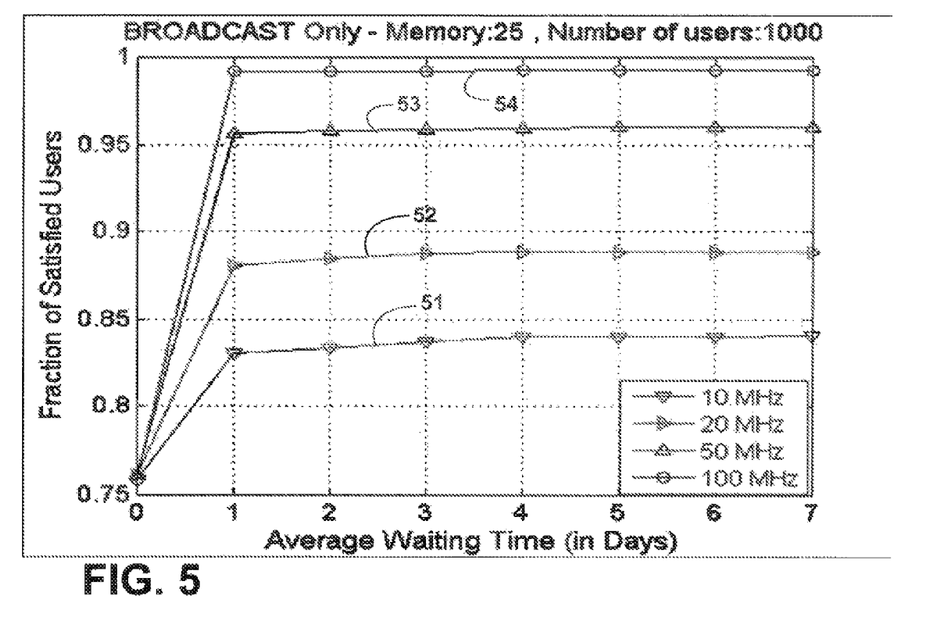
FIGS. 5 and 7 are graphs that show experimental simulation results of conventional broadcast only techniques.
Figure 6:
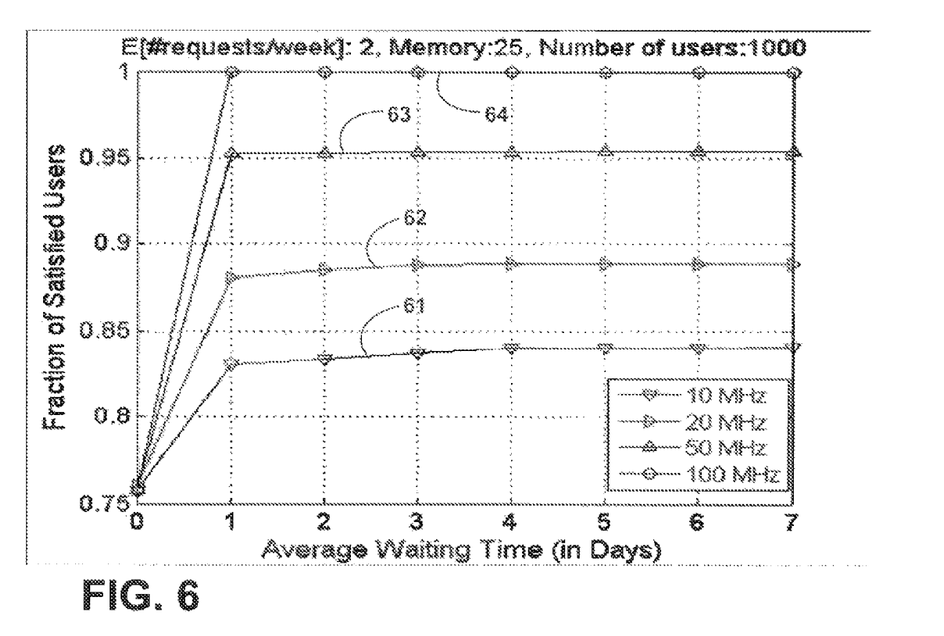
FIGS. 6 and 8 are graphs that show experimental simulation results of exemplary techniques of this disclosure.

FIGS. 5 and 6 are graphs that show experimental simulation results of satisfied customers if a broadcast only approach is used (FIG. 5) relative to scheduling techniques consistent with this disclosure (FIG. 6). The content requests associated with FIGS. 5 and 6 generally follow the box office distribution model discussed above, in which the content comprises a relatively small number of movies that are in high demand for many users. The user devices in this example comprise wireless set-top boxes. Each device in this example (each set-top box) can store 25 movies. In this example, it is assumed that 1000 users make approximately 2 requests per week for high definition (HD) movies.

In FIGS. 5 and 6, the vertical axis graphs the number of satisfied users, which generally means the number of users that have all of their content requests satisfied. FIG. 5 graphs the percentage of satisfied users and the average waiting time, with a value of 1 representing 100 percent satisfaction. Line 51 shows that the percentage of satisfied users is between 80 and 85 percent when the system has a bandwidth of 10 Megahertz (MHz). Line 52 shows that the percentage of satisfied users is between 85 and 95 percent when the system has a bandwidth of 20 MHz. Line 53 shows that the percentage of satisfied users is just over 95 percent when the system has a bandwidth of 50 MHz. Line 54 shows that the percentage of satisfied users is approximately 99 percent when the system has a bandwidth of 100 MHz. Interestingly, the number of satisfied users does not substantially increase as the days progress even though unsatisfied requests from one day are included in the next day, which seems to indicate that the lowest priority content requests do not get serviced, regardless of the amount of time that progresses. The system may be adapted to address this deficiency by assigning higher priority to any requests that remain un-serviced after a defined number of days. The term "bandwidth" as used herein generally refers to the available spectrum for data communication in a given context. For example, in a WCDMA system, each carrier uses 5 megahertz of spectrum, while in CDMA2000 networks, 1.25 megahertz of spectrum is used for each carrier. These carriers may define the bandwidth between a given base station and all the devices in that given cell.

FIG. 6 graphs the fraction of satisfied users and the average waiting time if the techniques of this disclosure are used in a box office distribution model. In this case, the distribution techniques used both broadcast and single cell multicast. Again, a value of 1 represents 100 percent satisfaction. Line 61 shows that the percentage of satisfied users is between approximately 83 and 84 percent when the system has a bandwidth of 10 MHz. Line 62 shows that the percentage of satisfied users is between approximately 87 and 88 percent when the system has a bandwidth of 20 MHz. Line 63 shows that the percentage of satisfied users is just over 95 percent when the system has a bandwidth of 50 MHz. Line 64 shows that the percentage of satisfied users is approximately 100 percent when the system has a bandwidth of 100 MHz. Like with the "broadcast only" approach shown in FIG. 5, the techniques of this disclosure shown in FIG. 6 may not substantially increase the number of satisfied users as the days progress, which seems to indicate that the lowest priority content requests do not get serviced, regardless of the amount of time that progresses. Again, the system may be adapted to address this deficiency by assigning higher priority to any requests that remain un-serviced after a defined number of days. Slight improvement can be seen in the results of FIG. 6 relative to FIG. 5. For example, the techniques of this disclosure were able to achieve 100% user satisfaction, where a broadcast-only scheduler was unable to achieve this level of user satisfaction.

Figure 7:
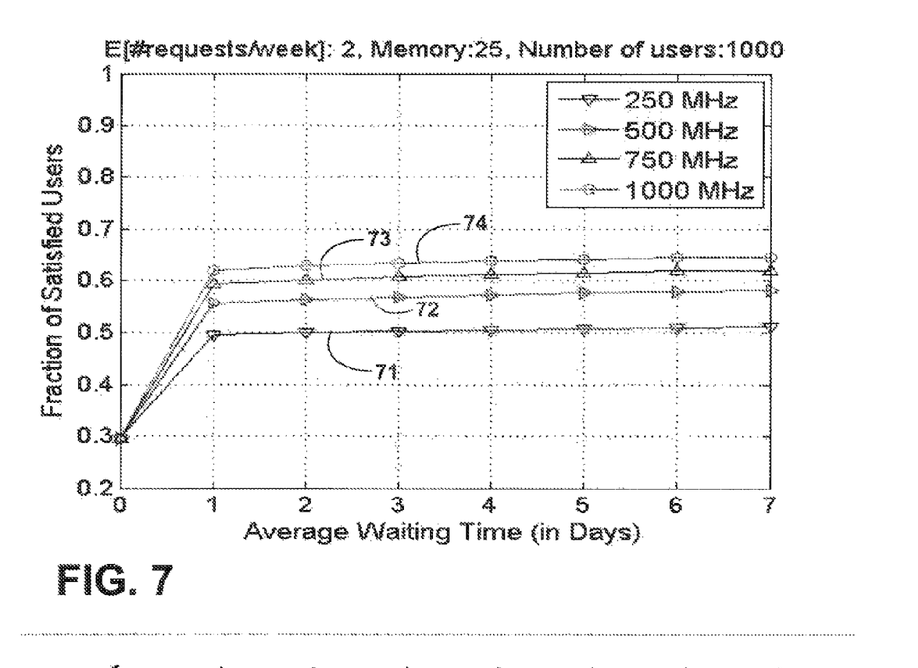
Figure 8:
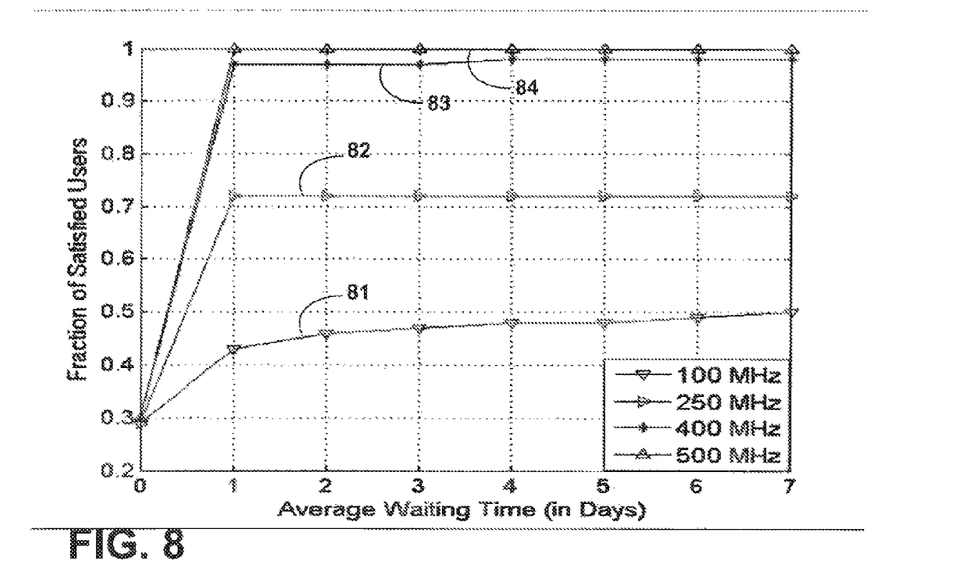

FIGS. 7 and 8 are graphs that show experimental results of satisfied customers if a broadcast only approach is used (FIG. 7) relative to scheduling techniques consistent with this disclosure (FIG. 8). The content requests associated with FIGS. 7 and 8 generally follow the rental distribution model discussed above, in which the content comprises a relatively large number of movies that are in lower demand for different users. The user devices in this example comprise set-top boxes. Each device in this example (each set-top box) can store 25 movies. In this example, it is assumed that 1000 users make approximately 2 requests per week for HD movies.

In FIGS. 7 and 8, the vertical axis graphs the number of satisfied users, which means the number of users that have all of their content requests satisfied. FIG. 7 graphs the percentage of satisfied users and the average waiting time, with a value of 1 representing 100 percent satisfaction. Line 71 shows that the percentage of satisfied users is approximately 50 when the system has a bandwidth of 250 MHz. Line 72 shows that the percentage of satisfied users is approximately 55 percent when the system has a bandwidth of 500 MHz. Line 73 shows that the percentage of satisfied users is approximately 59 percent when the system has a bandwidth of 750 MHz. Line 74 shows that the percentage of satisfied users is approximately 62 percent when the system has a bandwidth of 1000 MHz. Like the other examples, the number of satisfied users does not substantially increase as the days progress, which seems to indicate that the lowest priority content requests do not get serviced, regardless of the amount of time that progresses.

FIG. 8 graphs the fraction of satisfied users and the average waiting time if the techniques of this disclosure are used in a rental distribution model. In this case, the distribution techniques used both broadcast and single cell multicast. Again, a value of 1 represents 100 percent satisfaction. Line 81 shows that the percentage of satisfied users is between approximately 45 and 50 percent when the system has a bandwidth of 100 MHz. Line 82 shows that the percentage of satisfied users is approximately 72 percent when the system has a bandwidth of 250 MHz. Line 83 shows that the percentage of satisfied users is approximately 97 percent when the system has a bandwidth of 400 MHz. Line 84 shows that the percentage of satisfied users is approximately 100 percent when the system has a bandwidth of 500 MHz. Based on FIG. 8 relative to FIG. 7, it seems that the techniques of this disclosure can drastically improve performance of the system for the rental distribution model. At 500 MHz, the techniques of this disclosure yield 100 percent user satisfaction, while conventional broadcast only techniques yield satisfaction around 55 percent.

Figure 9:
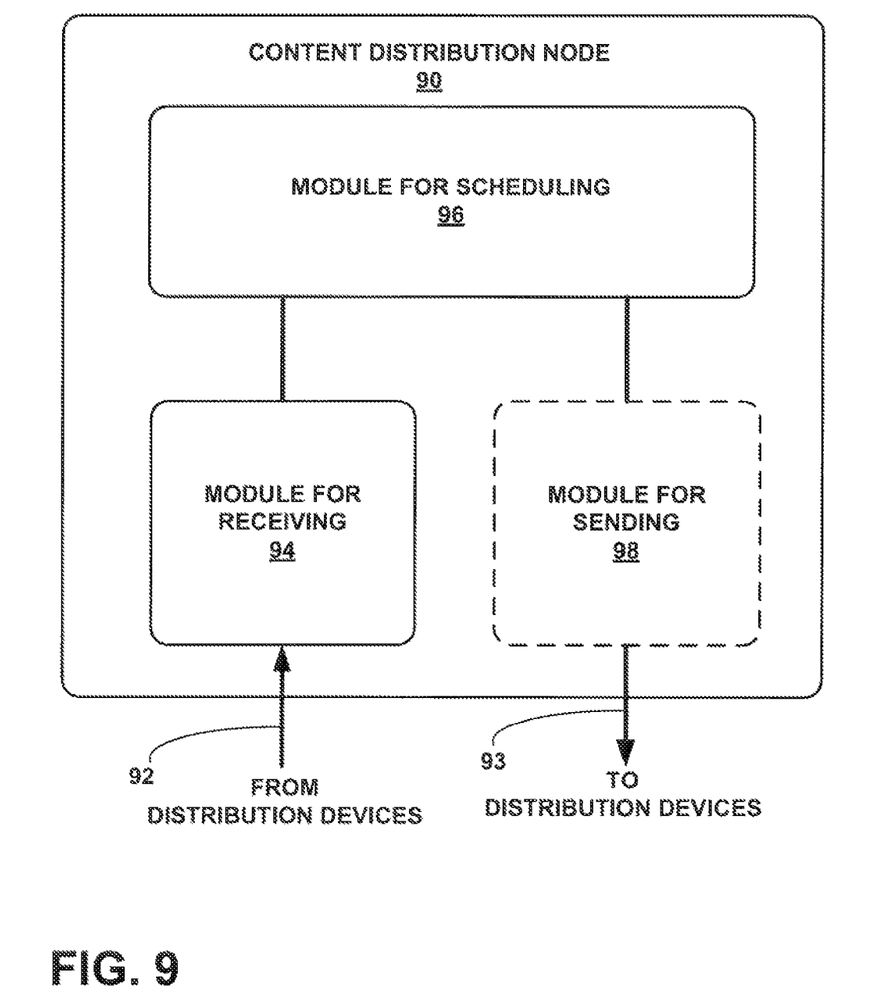
FIG. 9 is another block diagram illustrating an exemplary content distribution node that may implement one or more of the techniques of this disclosure.

FIG. 9 is another block diagram of an exemplary content distribution node 90, which may correspond to content distribution node 10 of FIG. 1. Content distribution node 90 includes communication interfaces 92, 93 that interface with the distribution devices such as base stations. Module for receiving 94 receives content requests associated with devices from via communication interface 92. In addition, module for receiving 94 may receive other information, such as channel information associated with the wireless communication channels between devices that request content and devices that distribute the content.

Module for scheduling 96 schedules distribution of a first set of content to a first set of devices via a first distribution technique, and schedules distribution of a second set of content to a second set of devices via a second distribution technique. For example, module for scheduling 96 may choose between two more of the following techniques for different sets of content: broadcast, multi-cell multicast, single cell multicast and unicast. Module for sending 98 outputs the scheduling information generated by module for scheduling 96 to distribution devices via communication interface 23.

In accordance with this disclosure, means for sending may comprise a transmitter 28 (FIG. 2) or a module for sending 98 (FIG. 9). Means for receiving may comprise a receiver 24 (FIG. 2) or a module for receiving 94 (FIG. 9). Means for scheduling may comprise a scheduler 26 (FIG. 2) or a module for scheduling 96 (FIG. 9). The different units may be separate units, or may be integrated into one or more common components.

The techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to a single processor or multiple processors, including any of the foregoing structure or any other structure suitable for implementation of the techniques described herein. In addition, in some aspects, the functionality described herein may be provided within dedicated software modules or hardware modules configured for performing the techniques described herein.

Steps of a method or algorithm described in connection with the aspects disclosed herein may be embodied directly in hardware, in a software module executed by a processor, or in a combination of the two. A software module (e.g., including executable instructions and related data) and other data may reside in a storage medium (e.g., data memory) such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Again, in some aspects any suitable computer-program product may comprise a computer-readable medium comprising codes (e.g., executable by at least one computer) relating to one or more of the aspects of the disclosure. In some aspects, a computer program product may comprise packaging materials.

If implemented in hardware, the techniques of this disclosure may be directed to an apparatus, such as a circuit or device configured to perform the techniques described herein. Accordingly, this disclosure also contemplates a circuit configured to perform the techniques described herein.

Various aspects of the invention have been described. These and other aspects are within the scope of the following claims.

The invention claimed is:

1. A method for scheduling distribution of content to a plurality of devices in a wireless communication network, comprising:
   receiving content requests associated with the plurality of devices;
   after the content requests are received, determining a number of the content requests that would be satisfied within a predefined period of time for multiple different combinations of the content delivered via a first distribution technique and a second distribution technique;
   selecting one of the combinations that substantially maximizes a number of the content requests that would be satisfied;
   scheduling distribution of a first set of content to a first set of the devices via the first distribution technique based on the selected combination; and
   scheduling distribution of a second set of content to a second set of the devices via the second distribution technique based on the selected combination.

2. The method of claim 1, further comprising:
   receiving channel information associated with the plurality of devices, wherein the scheduling the distribution of the first set of content to the first set of the devices and the scheduling the distribution of the second set of content to the second set of the devices are based on the channel information.

3. The method of claim 1, wherein the wireless communication network comprises a cellular-based communication network;
   the first distribution technique comprises a set of unicasts to specific devices within cells of the wireless communication network; and
   the second distribution technique comprises a multicast to multiple devices within one or more cells of the wireless communication network.

4. The method of claim 1, wherein the content comprises one or more of the following:
   a movie;
   an audio file;
   a video file;
   a software package;
   a software upgrade;
   a video game; and
   a data file.

5. The method of claim 1, further comprising:
sending information to base stations of the wireless communication network to instruct the base stations to distribute the first set of content to the first set of the devices via the first distribution technique and to distribute the second set of content to the second set of the devices via the second distribution technique.

6. A method for scheduling distribution of content to a plurality of devices in a wireless communication network, comprising:
receiving content requests associated with the plurality of devices;
determining a number of the content requests that would be satisfied within a predefined period of time for multiple different combinations of the content delivered via a first distribution technique and a second distribution technique;
selecting one of the combinations that substantially maximizes a number of the content requests that would be satisfied;
scheduling distribution of a first set of content to a first set of the devices via the first distribution technique based on the selected combination; and
scheduling, in combination with the first distribution technique, distribution of a second set of content to a second set of the devices via the second distribution technique based on the selected combination,
wherein the wireless communication network comprises a cellular-based communication network; the first distribution technique comprises cell-based multicast to devices within a specific cell of the wireless communication network; and the second distribution technique comprises a multi-cell-based multicast to devices within multiple cells of the wireless communication network.

7. A method for scheduling distribution of content to a plurality of devices in a wireless communication network, comprising:
receiving content requests associated with the plurality of devices;
determining a number of the content requests that would be satisfied within a predefined period of time for multiple different combinations of the content delivered via a first distribution technique and a second distribution technique;
selecting one of the combinations that substantially maximizes a number of the content requests that would be satisfied;
scheduling distribution of a first set of content to a first set of the devices via the first distribution technique based on the selected combination; and
scheduling, in combination with the first distribution technique, distribution of a second set of content to a second set of the devices via the second distribution technique based on the selected combination,
wherein the wireless communication network comprises a cellular-based communication network; the first distribution technique comprises cell-based multicast to devices within a specific cell of the wireless communication network; and the second distribution technique comprises a network-wide broadcast to all devices within the wireless communication network.

8. A method for scheduling distribution of content to a plurality of devices in a wireless communication network, the method comprising:
receiving content requests associated with the plurality of devices;
determining a number of the content requests that would be satisfied for different combinations of the content delivered via a first distribution technique and a second distribution technique;
selecting one of the combinations having a highest number of the content requests that would be satisfied;
scheduling distribution of a first set of content to a first set of the devices via the first distribution technique based on the selected combination; and
scheduling distribution of a second set of content to a second set of the devices via the second distribution technique based on the selected combination.

9. An apparatus that schedules distribution of content to a plurality of devices in a wireless communication network, comprising:
a receiver configured to receive content requests associated with the plurality of devices; and
a scheduler configured to:
determine a number of the content requests that would be satisfied within a predefined period of time for multiple different combinations of the content delivered via a first distribution technique and a second distribution technique after the content requests are received, and selects one of the combinations that maximizes a number of the content requests that would be satisfied;
schedule distribution of a first set of content to a first set of the devices via the first distribution technique based on the selected combination, and
schedule distribution of a second set of content to a second set of the devices via the second distribution technique based on the selected combination.

10. The apparatus of claim 9, wherein:
the receiver is configured to receive channel information associated with the plurality of devices; and
the scheduler is configured to schedule the distribution of the first set of content to the first set of the devices and to schedule the distribution of the second set of content to the second set of the devices based on the channel information.

11. The apparatus of claim 9, wherein the wireless communication network comprises a cellular-based communication network;
the first distribution technique comprises a set of unicasts to specific devices within cells of the wireless communication network; and
the second distribution technique comprises a multicast to multiple devices within one or more cells of the wireless communication network.

12. The apparatus of claim 9, wherein the content comprises one or more of the following:
a movie;
an audio file;
a video file;
a software package;
a software upgrade;
a video game; and
a data file.

13. The apparatus of claim 9, further comprising:
a transmitter configured to send information to base stations of the wireless communication network to instruct the base stations to distribute the first set of content to the first set of the devices via the first distribution technique and distribute the second set of content to the second set of the devices via the second distribution technique.

14. An apparatus that schedules distribution of content to a plurality of devices in a wireless communication network, comprising:
   a receiver configured to receive content requests associated with the plurality of devices; and
   a scheduler configured to:
      determine a number of the content requests that would be satisfied within a predefined period of time for multiple different combinations of the content delivered via a first distribution technique and a second distribution technique;
      select one of the combinations that substantially maximizes a number of the content requests that would be satisfied; and
      schedule distribution of a first set of content to a first set of the devices via the first distribution technique based on the selected combination, and schedules distribution of a second set of content, in combination with the first distribution technique, to a second set of the devices via the second distribution technique based on the selected combination,
      wherein the wireless communication network comprises a cellular-based communication; the first distribution technique comprises cell-based multicast to devices within a specific cell of the wireless communication network; and the second distribution technique comprises a multi-cell-based multicast to devices within multiple cells of the wireless communication network.

15. An apparatus that schedules distribution of content to a plurality of devices in a wireless communication network, comprising:
   a receiver configured to receive content requests associated with the plurality of devices; and
   a scheduler configured to:
      determine a number of the content requests that would be satisfied within a predefined period of time for multiple different combinations of the content delivered via a first distribution technique and a second distribution technique;
      select one of the combinations that substantially maximizes a number of the content requests that would be satisfied; and
      schedule distribution of a first set of content to a first set of the devices via the first distribution technique based on the selected combination, and schedules distribution of a second set of content, in combination with the first distribution technique, to a second set of the devices via the second distribution technique based on the selected combination,
      wherein the wireless communication network comprises a cellular-based communication network; the first distribution technique comprises cell-based multicast to devices within a specific cell of the wireless communication network; and the second distribution technique comprises a network-wide broadcast to all devices within the wireless communication network.

16. An apparatus that schedules distribution of content to a plurality of devices in a wireless communication network, comprising:
   a receiver configured to receive content requests associated with the plurality of devices; and
   a scheduler configured to determine a number of the content requests that would be satisfied for different combinations of the content delivered via a first distribution technique in combination with a second distribution technique, selects one of the combinations having a highest number of the content requests that would be satisfied, schedules distribution of a first set of content to a first set of the devices via the first distribution technique based on the selected combination, and schedules distribution of a second set of content to a second set of the devices via the second distribution technique based on the selected combination.

17. An apparatus that schedules distribution of content to a plurality of devices in a wireless communication network, comprising:
   means for receiving content requests associated with the plurality of devices;
   means for determining, after the content requests are received, a number of the content requests that would be satisfied within a predefined period of time for multiple different combinations of the content delivered via a first distribution technique and a second distribution technique;
   means for selecting one of the combinations that substantially maximizes a number of content requests that would be satisfied; and
   means for scheduling distribution of a first set of content to a first set of the devices via the first distribution technique based on the selected combination and a second set of content to a second set of the devices via the second distribution technique based on the selected combination.

18. The apparatus of claim 17, wherein:
   the received content requests further comprise channel information associated with the plurality of devices; and
   the scheduling of the distribution of the first set of content to the first set of the devices and the scheduling of the distribution of the second set of content to the second set of the devices is based on the channel information.

19. The apparatus of claim 17, wherein the wireless communication network comprises a cellular-based communication network; the first distribution technique comprises a set of unicasts to specific devices within cells of the wireless communication network; and the second distribution technique comprises a multicast to multiple devices within one or more cells of the wireless communication network.

20. The apparatus of claim 17, wherein the content comprises one or more of the following:
   a movie;
   an audio file;
   a video file;
   a software package;
   a video game;
   a software upgrade; and
   a data file.

21. The apparatus of claim 17, further comprising:
   means for sending information to base stations of the wireless communication network to instruct the base stations to distribute the first set of content to the first set of the devices via the first distribution technique and distribute the second set of content to the second set of the devices via the second distribution technique.

22. An apparatus that schedules distribution of content to a plurality of devices in a wireless communication network, comprising:
   means for receiving content requests associated with the plurality of devices; and
   means for determining a number of the content requests that would be satisfied within a predefined period of time for multiple different combinations of the content delivered via a first distribution technique and a second distribution technique;

means for selecting one of the combinations that substantially maximizes a number of the content requests that would be satisfied;

means for scheduling distribution of a first set of content to a first set of the devices via the first distribution technique based on the selected combination and a second set of content, in combination with the first distribution technique, to a second set of the devices via the second distribution technique based on the selected combination, wherein the wireless communication network comprises a cellular-based communication network; the first distribution technique comprises cell-based multicast to devices within a specific cell of the wireless communication network; and the second distribution technique comprises a multi-cell-based multicast to devices within multiple cells of the wireless communication network.

23. An apparatus that schedules distribution of content to a plurality of devices in a wireless communication network, comprising:

means for receiving content requests associated with the plurality of devices;

means for determining a number of the content requests that would be satisfied within a predefined period of time for multiple different combinations of the content delivered via a first distribution technique and a second distribution technique;

means for selecting one of the combinations that substantially maximizes a number of the content requests that would be satisfied; and means for scheduling distribution of a first set of content to a first set of the devices via the first distribution technique based on the selected combination and a second set of content, in combination with the first distribution technique, to a second set of the devices via the second distribution technique based on the selected combination, wherein the wireless communication network comprises a cellular-based communication network; the first distribution technique comprises cell-based multicast to devices within a specific cell of the wireless communication network; and the second distribution technique comprises a network-wide broadcast to all devices within the wireless communication network.

24. An apparatus that schedules distribution of content to a plurality of devices in a wireless communication network, comprising:

means for receiving content requests associated with the plurality of devices;

means for determining a number of the content requests that would be satisfied for different combinations of the content delivered via a first distribution technique in combination with a second distribution technique;

means for selecting one of the combinations having a highest number of the content requests that would be satisfied; and means for scheduling distribution of a first set of content to a first set of the devices via the first distribution technique and a second set of content to a second set of the devices via the second distribution technique based on the selected combination.

25. A non-transitory computer-readable medium storing code executable by a computer, which causes the computer to perform the following:

receive content requests associated with a plurality of devices;

determine, after the content requests are received, a number of the content requests that would be satisfied within a predefined period of time for multiple different combinations of the content delivered via a first distribution technique and a second distribution technique;

select one of the combinations that substantially maximizes a number of the content requests that would be satisfied;

schedule distribution of a first set of content to a first set of the devices via the first distribution technique based on the selected combination; and schedule distribution of a second set of content to a second set of the devices via the second distribution technique based on the selected combination.

26. A content distribution node, comprising:

communication interfaces configured to interface with base stations of a wireless communication network;

a receiver configured to receive content requests associated with a plurality of devices in the wireless communication network from the base stations via the communication interfaces; and a scheduler configured to:
  determine a number of the content requests that would be satisfied within a predefined period of time for multiple different combinations of the content delivered via a first distribution technique and a second distribution technique after the content requests are received, and to select one of the combinations that maximizes a number of the content requests that would be satisfied;
  schedule distribution of a first set of content to a first set of the devices via the first distribution technique based on the selected combination, and
  schedule distribution of a second set of content to a second set of the devices via the second distribution technique based on the selected combination.

* * * * *